United States Patent [19]

Belforte

[11] 4,162,371
[45] Jul. 24, 1979

[54] METHOD OF AND MEANS FOR ESTABLISHING TWO-WAY COMMUNICATION BETWEEN TWO STATIONS INTERCONNECTED BY A SINGLE SIGNAL LINK

[75] Inventor: Piero Belforte, Turin, Italy

[73] Assignee: CSELT-Centro Studi e Laboratori Telecomunicazioni S.p.A., Turin, Italy

[21] Appl. No.: 869,171

[22] Filed: Jan. 13, 1978

[30] Foreign Application Priority Data

Jan. 14, 1977 [IT] Italy .............................. 67083 A/77

[51] Int. Cl.² .............................................. H04L 5/14
[52] U.S. Cl. ................................ 178/58 R; 179/16 F
[58] Field of Search ........................... 178/58, 59, 60; 343/175, 176; 179/16 F, 15 BL, 170 D, 170 E; 325/62

[56] References Cited

U.S. PATENT DOCUMENTS

| | | | |
|---|---|---|---|
| 3,519,743 | 7/1970 | Herter | 178/58 R |
| 3,862,364 | 1/1975 | Inose et al. | 178/59 |
| 4,012,590 | 3/1977 | Haass | 178/58 R |

*Primary Examiner*—Thomas A. Robinson
*Attorney, Agent, or Firm*—Karl F. Ross

[57] ABSTRACT

Two stations of a telecommunication system, interconnected by a single two-way signal link, have respective signal transmitters each working into an impedance network with a first branch connected to the two-way link and a second branch forming a voltage divider. Each station also has a signal receiver energized through a comparator which recovers the incoming signal from a composite signal present at a junction point between the two-way link and the first network branch by subtracting a balancing signal, available at the voltage divider, from this composite signal. The comparator may comprise a differential amplifier or a digital subtractor.

13 Claims, 4 Drawing Figures

4,162,371

METHOD OF AND MEANS FOR ESTABLISHING TWO-WAY COMMUNICATION BETWEEN TWO STATIONS INTERCONNECTED BY A SINGLE SIGNAL LINK

FIELD OF THE INVENTION

My present invention relates to a method of and circuitry for facilitating simultaneous two-way communication between a pair of stations of a telecommunication system interconnected by a bidirectional signal link.

BACKGROUND OF THE INVENTION

Duplexing circuits, designed to enable the simultaneous exchange of incoming and outgoing signals between two interconnecting stations, conventionally comprise separate signal paths (such as transmission lines) facilitating traffic in respective directions. The duplication of the signal path is expensive, especially over longer distances, and also complicates ancillary operations such as the checking of the integrity of the communication channel.

OBJECTS OF THE INVENTION

An important object of my present invention, therefore, is to provide a method of facilitating the simultaneous bidirectional exchange of messages with the use of but a single two-way signal link.

A related object is to provide duplexing circuitry for implementing this method.

SUMMARY OF THE INVENTION

In accordance with my present invention, an outgoing signal generated at either of the two more or less identical intercommunicating stations is split between the signal link and a local circuit, the component of this signal fed to the signal link being thus superimposed upon an incoming signal from the opposite station whereby a composite signal is formed. In order to recover this incoming signal, i.e., to isolate it from the outgoing component, I derive from the local circuit a balancing signal substantially identical with that component whose subtraction from the composite signal yields the incoming signal.

The circuitry at each station designed to carry out this method comprises, in accordance with another aspect of my invention, an impedance network connected to a signal generator which produces the outgoing signal, this network having a first branch connected to the signal link and a second branch provided with step-down means such as a voltage divider. A comparator, such as a differential amplifier, has a first input connected to a junction of the first network branch with the signal link and a second input connected to the step-down means (e.g., to a center tap of the voltage divider) so as to receive on the one hand the composite signal and on the other hand the balancing signal referred to above. A resulting difference signal, appearing in the output of the comparator, is fed to the signal receiver of the station.

Such circuitry can be designed for both analog and digital signals and can be realized in integrated form.

BRIEF DESCRIPTION OF THE DRAWING

The above and other features of the invention will now be described in detail with reference to the accompanying drawing in which.

SPECIFIC DESCRIPTION

Figure 1:
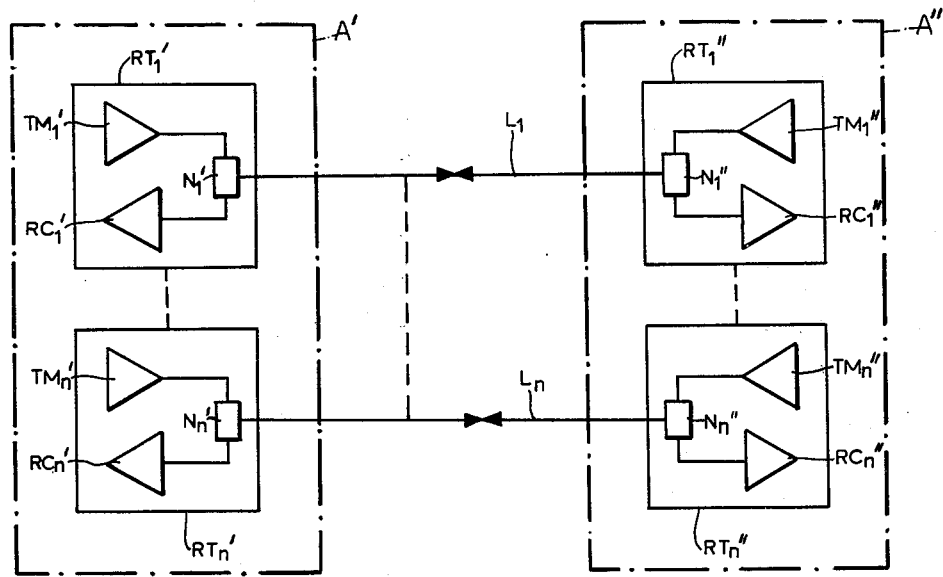
FIG. 1 is a block diagram showing the overall layout of a telecommunication system embodying my invention.

In FIG. 1 I have shown a telecommunication system with two subsystems A' and A" each comprising a multiplicity of transmit/receive stations $RT_1'$-$RT_n'$ and $RT_1''$-$RT_n''$. Stations paired with each other in the two subsystems, indicated by identical subscripts, are interconnected by two-way signal links $L_1$-$L_n$. Each station is seen to comprise a transmitting section $TM_1'$-$TM_n'$, $TM_1''$-$TM_n''$ and a receiving section $RC_1'$-$RC_n'$, $RC_1''$-$RC_n''$, the two sections of each station being both connected to the associated signal link via an impedance network $N_1'$-$N_n'$, $N_1''$-$N_n''$.

Figure 2:
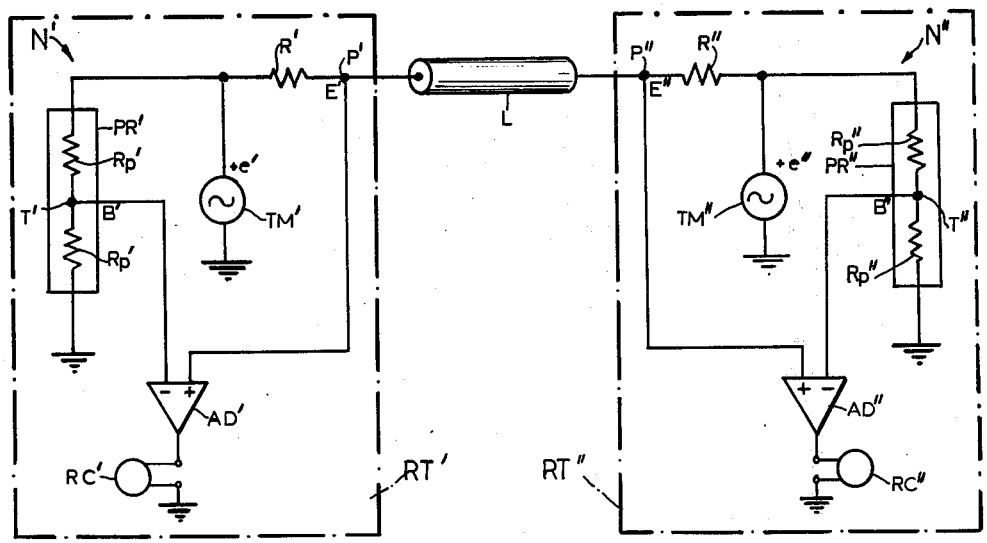
FIG. 2 is a more detailed circuit diagram of two intercommunicating stations forming part of the system of FIG. 1.

FIG. 2 shows details of a pair of such stations RT', RT" interconnected by a singal link L here shown as a coaxial cable; the link could also comprise a two-wire line, for example. The transmitter TM', TM" of each station is symbolically represented by a signal generator producing respective signals +e', +e" (the polarity being, of course, arbitrarily chosen). Each impedance network N', N" has a first branch R', R", i.e., and impedance (here shown as an ohmic resistance) in series with line L with which it forms a junction P', P", and a second branch forming a voltage divider PR', PR" consisting of two identical resistors Rp', Rp". The center tap T', T" of this voltage divider is connected to a subtractive input of a differential amplifier AD', AD" whose additive input is tied to the respective junction point P', P". The differential amplifier, comparing the two signals present in its inputs, works into the receiver RC', RC" of the station.

With line L terminated at both ends by matching impedances R' and R", each transmitter TM', TM" sees that line as an impedance Z in series with a resistance R' or R" of like magnitude; thus, the outgoing signal e'(t), varying as a function of time t, appears with half its magnitude at junction point P'. With a component of signal e"(t) from station RT" coming in over line L, a composite signal $E' = [e'(t) + e''(t - t_p)]/2$ appears at point P' with $t_p$ representing the propagation time over line L. In an analogous manner, a composite signal $E'' = [e''(t) + e'(t - t_p)]/2$ is concurrently present at point P".

A balancing or compensating signal B' present at tap T' of divider PR' has a magnitude e'(t) which equals that of the component of outgoing signal e' contributing to composite signal E'. Thus, differential amplifier AD' produces the difference E' − B' which, upon amplification by a factor of 2, equals (except for the delay $t_p$) the voltage e" generated by transmitter TM" of station RT". Receiver RC', accordingly, is energized only with the incoming signal.

In a like manner, amplifier AD" subtracts a balancing signal B" from composite signal E" present at point P" to recover the signal e' emitted by station RT'.

Figure 3:
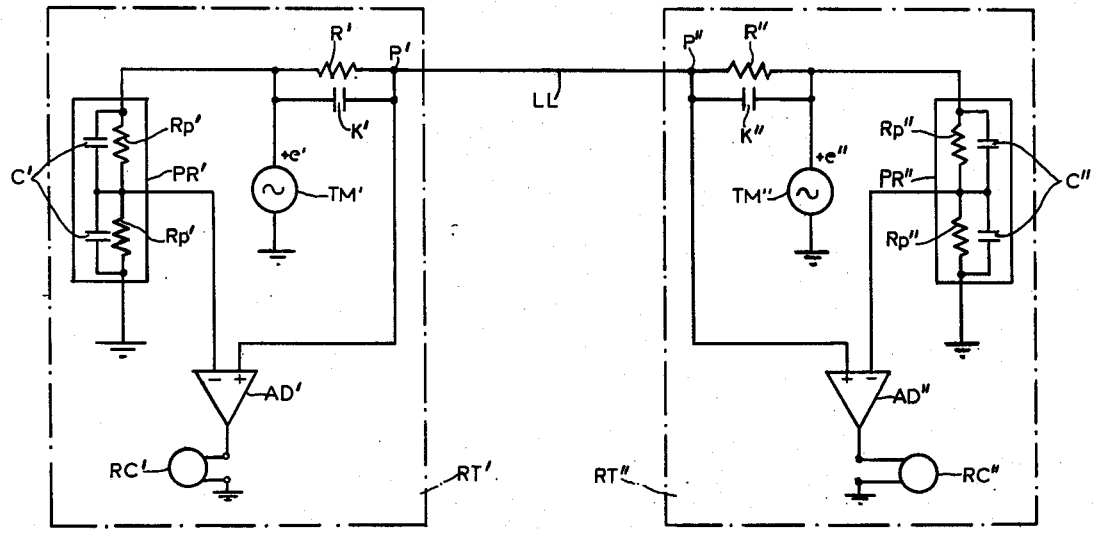
FIG. 3 is a circuit diagram similar to FIG. 2, illustrating a modification.

In FIG. 3 I have shown a similar system wherein, however, a signal link LL interconnecting the two stations RT' and RT" has a characteristic impedance so low as to constitute practically a short circuit. In this case the network branches R', PR' and R", PR", aside from being equal to one another, need not have any specific magnitude. FIG. 3 also indicates that, in lieu of purely ohmic resistances as shown in FIG. 2, these network impedances could be partly reactive; in particular, I have shown resistors R' and R" shunted by capacitors K' and K", similar capacitors C' and C" (of a combined capacitance equaling that of capacitors K' and K") being connected in parallel with voltage-divider sections Rp' and Rp". In this system the time delay $t_p$ will be practically zero.

The foregoing description contemplates an idealized situation with transmitters TM' and TM" having zero internal impedance so as to shunt the incoming signals to ground and with receivers RC', RC" having infinite input impedances; it is also assumed that lines L and LL are practically loss-free. Such an idealized situation will be approximately with many actual transmission systems, especially those operating with binary signals. If, however, line losses become significant, the step-down factor of 1:2 provided by voltage dividers PR" and PR" no longer applies. The various network impedances will then have to be differently dimensioned to take the actual circuit parameters into account, i.e., to provide balancing signals B', B" compensating for the contributions of the outgoing signals e', e" to the composite signals E', E".

Figure 4:
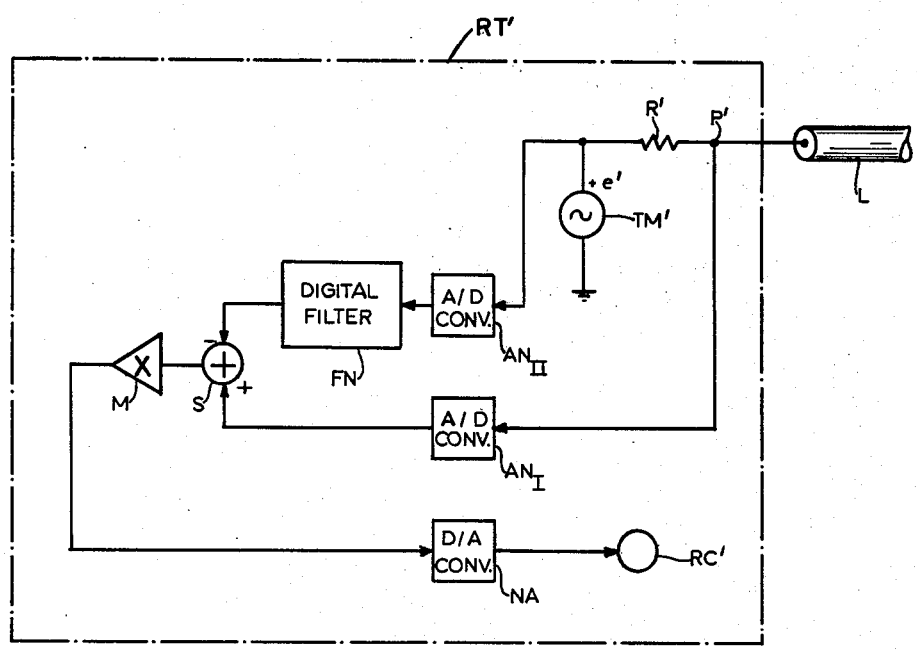
FIG. 4 is a circuit diagram of one such station, showing a further modification.

In cases where a significant part of the incoming signal (such as e") appears at the input of the step-down circuit (e.g., PR'), that part ought to be filtered out so as not to enter into the balancing signal (e.g., B'). A convenient way of eliminating this part of the incoming signal is by digital filtering. Thus, in the case of analog signals, a conversion into digital signals and subsequent reconversion to analog form will be desirable. FIG. 4 shows such an arrangement wherein station RT' (which of course is also representative of companion station RT") includes a first analog/digital converter $AN_I$, inserted between junction point P' and a positive input of a binary adder S, and a second analog/digital converter $AN_{II}$, inserted between the output of transmitter TM' and the negative input of binary adder S in series with a digital filter FN. The latter extracts from the output of converter $AN_{II}$ the proper fractional part of digitized signal e' to balance the contribution of this signal to the composite signal appearing in digitized form at the output of converter $AN_I$. The difference signal produced by adder S is amplified in a digital multiplier M to substantially the original level of the incoming signal, as described above with reference to amplifiers AD' and AD". Multiplier M works into a digital/analog converter NA which feeds the receiver RC'.

It will be apparent that the cost of the additional circuitry provided by my invention at each station, even with analog/digital conversion as in FIG. 4, will generally be outweighed by the saving resulting from elimination of an entire signal path. The increased operating convenience represents an additional benefit.

Integrated circuitry for realizing the various network components is well known in the art.

Although the system described above uses signals which are unbalanced with reference to ground, it will be understood that balanced signals could be transmitted and received in a similar manner.

I claim:

1. A method of facilitating simultaneous signaling in two directions between a pair of stations of a telecommunication system interconnected by an unbalanced transmission line constituting a two-way signal link, comprising the steps of:

generating, at each of said stations, an outgoing signal as a first unbalanced voltage with reference to ground;

splitting said outgoing signal between a conductor of said transmission line and a local circuit;

extracting, at each of said stations, from said conductor a composite signal as a second unbalanced voltage including an incoming signal and a component of said outgoing signal;

deriving from said local circuit a compensating signal substantially identical with said component; and subtracting said compensating signal from said composite signal, thereby producing a further unbalanced voltage substantially corresponding to said incoming signal.

2. A method as defined in claim 1, comprising the further step of amplifying at each of said stations the isolated incoming signal to substantially the level of the corresponding outgoing signal generated at the opposite station.

3. A method as defined in claim 1 wherein said balancing signal is derived from the portion of said outgoing signal fed to said local circuit by stepping down said portion to a predetermined fraction.

4. In a telecommunication system comprising a pair of stations interconnected by a two-way signal link, the combination therewith of circuitry at each of said stations facilitating simultaneous exchange of outgoing and incoming signals with the other station, said circuitry comprising:

signal-generating means producing an outgoing signal;

an impedance network connected to said signal-generating means, said network having a first branch connected to said signal link and a second branch provided with step-down means including a binary subtractor;

comparison means with a first input connected to a junction of said first branch with said signal link for obtaining therefrom a composite signal and with a second input connected to said step-down means for obtaining therefrom a balancing signal substantially identical with a component of said outgoing signal fed via said first branch to said signal link; and signal-receiving means connected to said comparison means for obtaining therefrom an incoming signal produced by subtracting said balancing signal from said composite signal.

5. The combination defined in claim 4 wherein said step-down means comprises a digital filter.

6. The combination defined in claim 5 wherein said outgoing and incoming signals are analog voltages, said impedance network further comprising a first analog/digital converter between said junction and said first input, a second analog/digital converter between said signal-generating means and said digital filter, and a digital/analog converter between said comparison means and said signal-receiving means.

7. The combination defined in claim 4, further comprising a digital multiplier inserted between said binary subtractor and said signal-receiving means.

8. A method of facilitating simultaneous signaling in two directions between a pair of stations of a telecommunication system interconnected by a two-way signal link comprising the steps of:

generating, at each of said stations, a first analog voltage fed in part as an outgoing signal to said signal link;

digitizing another part of said first analog voltage to form a first binary signal;

extracting, at each of said stations, from said signal link a composite signal in the form of a second analog voltage including an incoming signal and a component of said outgoing signal;

digitizing said second analog voltage to form a second binary signal;

stepping down said first binary signal in a digital filter to form a third binary signal balancing a part of said second binary signal corresponding to said component;

subtracting said third binary signal from said second binary signal to form a resulting binary signal; and converting said resulting binary signal to analog form, thereby substantially reconstituting said incoming signal.

9. A method as defined in claim 8, comprising the further step of digitally multiplying said resulting binary signal before converting same to analog form.

10. In a telecommunication system comprising a pair of stations interconnected by a conductor forming a two-way signal link, the combination therewith of circuitry at each of said stations facilitating simultaneous exchange of outgoing and incoming signals with the other station, said circuitry comprising:

signal-generating means producing an outgoing signal unbalanced with reference to ground;

an impedance network connected to said signal-generating means, said network having a first branch connected to said conductor and a second branch provided with step-down means;

comparison means with a first input connected to a junction of said first branch with said conductor for obtaining therefrom a composite signal and with a second input connected to said step-down means for obtaining therefrom a compensating signal substantially identical with a component of said outgoing signal fed via said first branch to said conductor; and signal-receiving means connected to said comparison means for obtaining therefrom an incoming signal produced by subtracting said compensating signal from said composite signal.

11. The combination defined in claim 10 wherein said comparison means comprises a differential amplifier.

12. The combination defined in claim 10 wherein said signal link is a line with a significant characteristic impedance, said first branch comprising a series impedance substantially equaling said characteristic impedance, said step-down means being a voltage divider with an overall impedance substantially equaling said characteristic impedance.

13. The combination defined in claim 12 wherein said second input is connected to a center tap of said voltage divider.

* * * * *